(12) United States Patent
Ramirez et al.

(10) Patent No.: US 8,560,681 B2
(45) Date of Patent: Oct. 15, 2013

(54) METHOD OF CHARACTERIZING A SOCIAL NETWORK COMMUNICATION USING MOTIFS

(75) Inventors: Nuria Oliver Ramirez, Madrid (ES); Qiankun Zhao, Madrid (ES)

(73) Assignee: Telefonica, S.A., Madrid (ES)

( * ) Notice: Subject to any disclaimer, the term of this patent is extended or adjusted under 35 U.S.C. 154(b) by 225 days.

(21) Appl. No.: 13/104,904

(22) Filed: May 10, 2011

(65) Prior Publication Data

US 2012/0290649 A1 Nov. 15, 2012

(51) Int. Cl.
*G06F 15/16* (2006.01)
*G06F 15/173* (2006.01)

(52) U.S. Cl.
USPC .............. 709/224; 709/204; 709/205

(58) Field of Classification Search
USPC .......................... 709/224, 204, 205
See application file for complete search history.

(56) References Cited

U.S. PATENT DOCUMENTS

| | | | |
|---|---|---|---|
| 7,480,712 B2 * | 1/2009 | Moy | 709/223 |
| 8,316,127 B2 * | 11/2012 | Dahl | 709/224 |
| 2006/0173957 A1 * | 8/2006 | Robinson et al. | 709/204 |
| 2009/0070460 A1 * | 3/2009 | Shen et al. | 709/224 |
| 2009/0287813 A1 * | 11/2009 | Yibin et al. | 709/224 |
| 2010/0042944 A1 * | 2/2010 | Robinson et al. | 715/771 |
| 2010/0235489 A1 * | 9/2010 | Cogan | 709/224 |

* cited by examiner

*Primary Examiner* — Aaron Strange
(74) *Attorney, Agent, or Firm* — Knobbe Martens Olson & Bear LLP (57) ABSTRACT

The present disclosure relates generally to methods for characterizing communication networks, and more particularly to methods of characterizing the propagation of information throughout communications in such networks.

10 Claims, 7 Drawing Sheets

| CDR | CDR (Max flow) | Facebook |
|---|---|---|
| 2-Chain — 43.4% | 2-Chain — 42.4% | 2-Star — 38.7% |
| 2-Star — 29.6% | 2-Star — 30.9% | 2-Chain — 30.1% |
| 1-Chain-2-Pingpong — 5.2% | 1-Chain-2-Pingpong — 5.8% | 3-Star — 7.7% |
| 1-Pingpong-2-Chain — 4.6% | 1-Pingpong-2-Chain — 3.7% | 1-Chain-2-Pingpong — 6.5% |
| 1-Chain-2-Star — 3.2% | 3-Chain — 3.6% | 4-Star — 3.5% |
| 3-Chain — 2.2% | 1-Chain-2-Star — 3.2% | 1-Chain-2-Star — 2.4% |

METHOD OF CHARACTERIZING A SOCIAL NETWORK COMMUNICATION USING MOTIFS

FIELD OF THE INVENTION

The present invention relates generally to communication networks, and more particularly to the propagation of information throughout communications in such networks.

BACKGROUND OF THE INVENTION

Social networks represent the links between a set of entities connected to each other with different types of relationships. For example, papers are linked by citations in a citation network, bloggers are linked by comments or blogrolls in a blog network, while cell phones are connected via phone calls in a cell phone network.

In the literature, social networks have been extensively studied from a graph theory perspective (e.g., power laws, small world phenomenon, coverage, etc.). Also, properties of different types of complex networks have been compared.

Recently, research studies on social networks from a behavioral perspective have received a lot of attention. These works, dealing with problems such as community identification, spam detection, or modeling information flows have a lot of applications in recommender systems, social search, economics, and advertising.

A fundamental issue in analyzing information flow or propagation patterns within communication oriented social networks is how to represent the communication data in such a way that it captures every piece of useful information. In the literature, a few alternatives have been proposed and used to model the interactions among people where typically each user is represented as a node in the graph and each interaction as an edge in the graph or aggregating interactions between users by adding weights to the graph representation.

These representations are meaningful and valid in certain social networks, such as friends or citation networks, where the nature of the relationship is embedded in—or may be easily derived from the records. However, in the case of social networks derived from communication logs (e.g. phone calls), it is difficult to properly infer the nature of the relationships due to the multiplicity of reasons in making a call (e.g., business, personal, service, etc.) and the role that the temporal context plays on the communication. In other words, once one paper cited another, the relationship between both papers always holds true.

However, phone calls are made for different reasons and hence the nature of a relationship between two nodes in the network may also depend on the temporal context of the calls, i.e., a call made during working hours is probably of different nature than a call made at night. The same applies to other temporal attributes, such as duration and frequency of the interaction, or temporal distance between two calls (inter-call time delay). As a result, the representations that are used in existing information propagation studies are not valid in the context of phone communications. Furthermore, many studies on information propagation assume that consecutive interactions transmit the same piece of information within the inferred networks, which is not necessarily true in phone communications.

The recent availability of large amounts of data from a variety of networks (e.g., online social networks, social media and user generated content networks, proteins, etc.) has enabled the analysis of information propagation in such networks. Research work has been done to analyze cell phone, instant messaging, blog, Flickr, email, and protein interaction networks.

More recently, the dynamic properties of large scale social networks have been studied extensively where the temporal annotations of each communication are used to partition the entire dataset into a time series of snapshots, which is then studied in terms of its temporal patterns. Along these lines, research has been carried out on studying information cascading triggered by specific events. Other related work has been done on maximizing the influence within social networks from historical behaviour patterns and with probabilistic models, which solve the problem of viral marketing given the constraint of maximizing the influence over the network.

Kleinberg et al. in "*The structure of information pathways in a social communication network*" (In KDD, 2008) propose the temporal distance concept to find an information pathway in the network called the backbone structure, where information has the highest probability of flowing based on temporal communication habits.

The concept of motif originated in biology, where it has been defined as patterns that recur within a (transcription regulation) network much more often than expected at random. Within transcription regulation networks, research has been done to experimentally show that these network motifs are the building blocks of the network and play functional roles such as auto-regulation, pulse generator and response accelerators.

Individual users may make and receive a lot of phone calls. Traditional approaches create a link between adjacent calls that share at least one user, which may not be accurate enough to reflect how users communicate collectively and how information is propagated over the network. For example, two adjacent calls that are about two different pieces of information should not be used to create a path of information propagation. Note that the problem of identifying the piece of information that is propagated in each phone call or any other social interaction is still an open problem since usually the associated content is either not available or is too privacy-sensitive to be public.

The studies mentioned above have mainly focused on analyzing the structural or topological properties of different types of networks and building models that explain the data. However, there has been no work to date that combines the global topological properties of the network with local behavior patterns in order to shed light on the core principles of collective structural patterns. In addition, previous approaches have typically ignored the temporal attributes and strength of each individual communication.

SUMMARY OF THE INVENTION

The invention refers to a method of characterizing a network communication according to claim 1. Preferred embodiments of the method are defined in the dependent claims.

In order to overcome the problems indicated in the previous section, the present invention provides a method of characterizing a communication network which is based on the assumption that the communication within the social network is event-driven (e.g., in a phone communication network, each phone call is made with the purpose of propagating or getting a certain piece of information). More specifically, the proposed method considers both the temporal information of the communication interactions within the network, and the duration of such interactions as a parameter indicative of the information passed in such interaction.

The proposed method for characterizing a network communication, for each communication interaction between two users, $u_i^o$, $u_i^d$, of said network, takes the following data as input:

a temporal annotation $t_i$ of each communication interaction, and a duration $\delta_i$ of each communication interaction; and, a first communication interaction and a second communication interaction within the network are considered for characterization of such network and form part of a communication graph C if:
a) said first and second communication interactions have at least one user in common; and,
b) the time lapsed between the end of the first communication interaction and the beginning of the second communication interaction is within a pre-established time window W;
each communication graph $C_i^j$ being formed by i unique users and j communication interactions that fulfil the conditions a) and b) set before.

The temporal constraint given by the time window W is the core filter to eliminate some of the noise in the data. Thus, the method proposed uses the temporal attributes and the duration of the different interactions (e.g. calls) within a network so as to characterize it.

Hence, considering that the temporal annotations of social interactions are available, in the proposed method:

each interaction between two users and its corresponding timestamp is taken as evidence of information propagation between the users;

two adjacent interactions (i.e., interactions that share at least one common user) are likely to be about the same piece of information if they are temporally close;

every piece of information is only valid for a time window W (e.g., 1 hour, 2 days, etc, depending on the type of network); and users either propagate this information via immediate interactions within W or they will not propagate it any more.

The method preferably further comprises the step of filtering out each communication graph with a frequency constraint: a communication graph is considered for characterization if the same type of communication graph appears more than a certain number of times in the social interaction network.

According to the proposed method, two communication graphs are preferably considered of the same type when they share the same topology structure.

Preferably, for a given a support threshold $\ominus$, any equivalence class of the communication graphs S={Cij(1), Cij(2), Cij(3), ... Cij(n)} based on graph equivalence with no less than $\ominus$ communication graphs is referred to as a communication motif.

Each communication motif can be extracted using a process based on an earliest first search EFS.

A communication motif is a maximum-flow motif when it maximizes the flow of information within the network.

This way, the proposed method characterizes the functional communication patterns of social interaction networks that not only occur frequently but also are indicative of the process of information propagation in the network.

The method proposed here includes a generic approach—via the so-called communication motifs—that characterizes different types of events and the proposed communication motifs characterize how information is propagated from both a functional and quantitative perspective.

The size of the time window W preferably depends on the type of network.

A communication graph has to appear more than a certain number of times in the network in order to be considered.

Said temporal annotation $t_i$ can be a timestamp of the beginning of the communication interaction, or a timestamp of the end of the communication interaction.

BRIEF DESCRIPTION OF THE DRAWINGS

To complete the description and in order to ease the understanding of the invention, a set of drawings is provided. Said drawings form an integral part of the description and illustrate preferred embodiments of the invention, which should not be interpreted as restricting the scope of the invention, but just as examples of how the invention can be embodied. The drawings comprise the following figures.

DETAILED DESCRIPTION OF THE PREFERRED EMBODIMENTS

Reference will now be made in detail to a preferred embodiment of the method for characterizing social networks.

Figure 1:
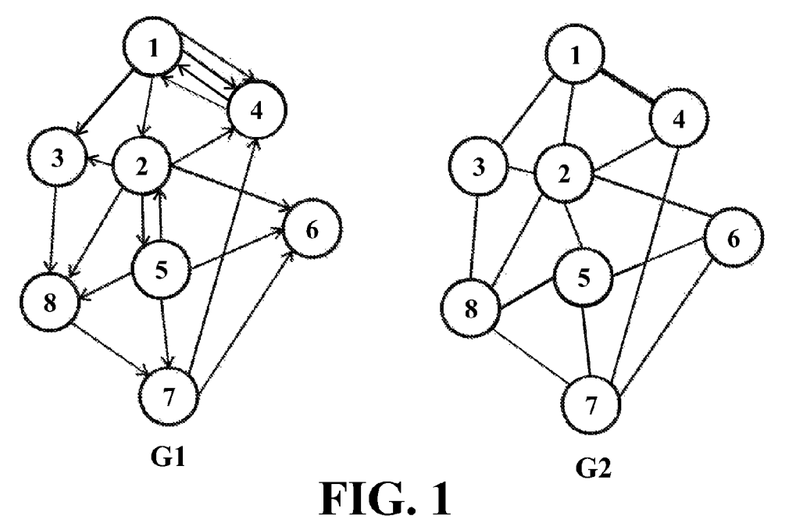
FIG. 1 illustrates several possible graph representations of Call Detail Record (CDR) data.

A fundamental issue in analyzing information flow or propagation patterns within communication oriented social networks is how to represent the communication data in such a way that it captures every piece of useful information. We consider the example in Table 1, which shows several entries from a phone call detail record (CDR) dataset, where calls between users and their associated durations and timestamps are recorded, with one entry per call. A number of alternative representations of the CDR data in Table 1 are shown in FIG. 1. The first graph G1 is constructed by taking each user (caller/callee) as a node and each call between any two users as an edge between the two corresponding nodes. Graph G2 extends G1 by adding weights to the edges proportional to the frequency of calls between any two nodes.

TABLE 1

| CDR (Call Detail Record) | | | |
|---|---|---|---|
| caller | callee | timestamp | duration |
| 1 | 3 | 9:00 am, 11-Aug-08 | 2 minutes |
| 3 | 8 | 9:10 am, 11-Aug-08 | 5 minutes |
| 8 | 7 | 9:21 am, 11-Aug-08 | 3 minutes |
| 7 | 6 | 9:41 am, 11-Aug-08 | 2 minutes |

TABLE 1-continued

CDR (Call Detail Record)

| caller | callee | timestamp | duration |
|---|---|---|---|
| 1 | 2 | 9:59 am, 11-Aug-08 | 9 minutes |
| 2 | 4 | 10:08 am, 11-Aug-08 | 6 minutes |
| 4 | 1 | 10:43 am, 11-Aug-08 | 6 minutes |
| 1 | 4 | 10:36 am, 11-Aug-08 | 3 minutes |
| 4 | 1 | 11:08 am, 11-Aug-08 | 2 minutes |
| 1 | 4 | 11:36 am, 11-Aug-08 | 5 minutes |
| 2 | 5 | 11:36 am, 11-Aug-08 | 1 minutes |
| 2 | 3 | 11:46 am, 11-Aug-08 | 2 minutes |
| 2 | 6 | 11:56 am, 11-Aug-08 | 6 minutes |
| 2 | 8 | 1:36 pm, 11-Aug-08 | 5 minutes |
| 7 | 4 | 2:30 pm, 11-Aug-08 | 2 minutes |
| 5 | 2 | 5:36 am, 11-Aug-08 | 6 minutes |
| 5 | 6 | 5:56 pm, 11-Aug-08 | 1 minutes |
| 5 | 7 | 6:24 pm, 11-Aug-08 | 3 minutes |
| 5 | 8 | 6:38 pm, 11-Aug-08 | 2 minutes |

These representations shown in FIG. 1 are meaningful and valid in certain social networks such as friends or citation networks, where the nature of the relationship is embedded in—or may be easily derived from—the records. However, for the social networks derived from communication logs, it is difficult to properly infer the nature of the relationships due to the multiplicity of reasons in making a call (e.g., business, personal, service, etc.) and the implication of the temporal context. In other words, once one paper cited another, the cited relationship between both papers always holds true. However, phone calls are made for different reasons and hence the nature of a relationship between two nodes in the network may also depend on the temporal context of calls, i.e., a call made during working hours is probably of different nature than a call made at night. The same applies to other temporal attributes such as duration and frequency of the interaction, or temporal distance between two calls (inter-call time delay). As a result, the representations that are used in existing information propagation studies, are not valid in the context of phone communication networks. Furthermore, many studies on information propagation assume that consecutive interactions transmit the same piece of information within the inferred networks, which is not a valid assumption either.

Figure 2:
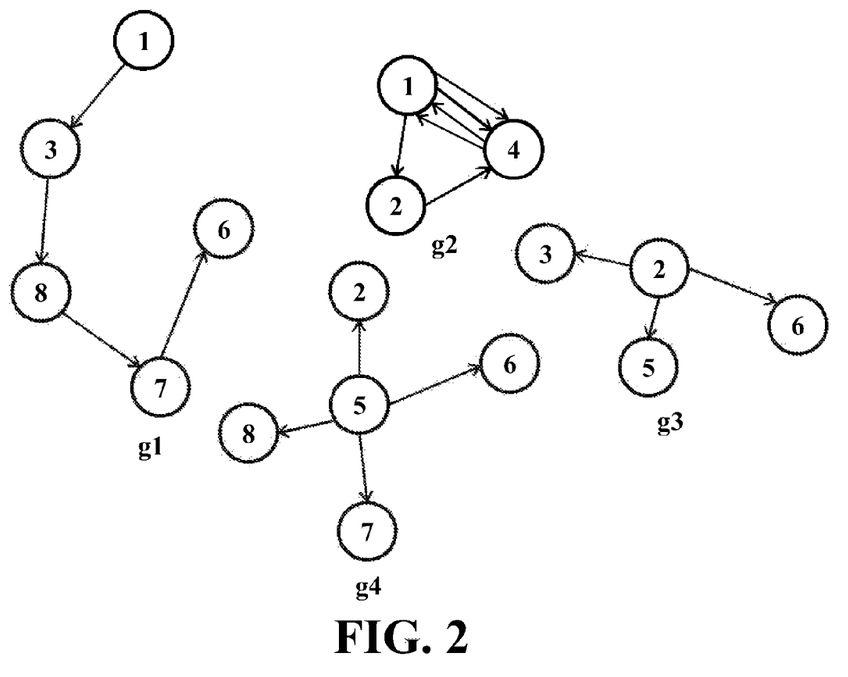
FIG. 2 shows several possible graph representations of CDR data, taking into consideration temporal constraints according to the proposed method.

We propose a novel and meaningful method to model the users' behaviors and information flow patterns. For example, based on the CDR data in Table 1, four different calling sequences g1-g2-g3-g4 are constructed by taking the call timestamps into account as shown in FIG. 2. In these graphs, two edges are connected if and only if their corresponding timestamps are within 30 minutes of each other. Compared to the graphs in FIG. 1, the four sequences in FIG. 2 take into account temporal information of calls, allowing a more accurate characterization of the behavior and information flows in social networks.

In fact, as demonstrated by our results, the temporal attributes associated with communication data are critical to model information propagation and the purpose behind each communication. The duration of each communication is a good indicator to quantify the amount of information being propagated.

Hence, in order to model how information is propagated in social networks, the concept of communication motif and maximum-flow motif are proposed. Two algorithms for discovering such motifs are proposed.

Hereafter, we use phone call networks created from Call Detail Records (CDRs) as an example of a communication network.

Let a database of CDRs be denoted by G. Each record in G is represented as 4-tuple $e_i = <u_i^o, u_i^d, t_i, \delta_i>$, where $u_i^o$ represents the caller, $u_i^d$ the callee, $t_i$ the timestamp when the call was established, and $\delta_i$ the duration of the call. To represent the information flow in this type of network, we define a communication graph as:

Definition of Communication Graph: For a given database of CDR represented as G and a time window W denoting the life span of every piece of information, a communication graph is defined as a subset of records from G, denoted as $C = \{e_1, e_2, \ldots, e_k\}$, such that $\forall e_i \in C$, $1 \le i \le k$, there exists at least one user $e_j \in C$ and $i \ne j$ such that:

1) $|\{u_i^o, u_i^d\} \cap \{u_j^o, u_j^d\}| > 0$, and
2) $0 < t_i - t_j - \delta_j < W$ or $0 < t_j - t_i - \delta_i < W$.

Note that even though there are k entries in the communication graph, the number of unique users involved can be different depending on the characteristics of the calls that form this communication graph. Therefore, each communication graph is annotated with two numbers $C_i^j$, where i denotes the number of unique users (nodes in C) and j denotes the number of interactions (edges) that form this communication graph.

For instance and without loss of generality, given the list of calls in the CDR database shown in Table 1 (e.g., 1→3, 3→8, . . . ), and setting the time window W to 30 minutes, then the first graph g1 in FIG. 2 is denoted $C_5^4$, i.e., a communication graph with 5 users and 4 calls (edges).

The temporal constraint given by the time window W is the core filter to eliminate some of the noise in the data. For example, in traditional social network information flow analysis approaches, if there is a strong link between user A and B, and there is a strong link between B and C, then it is assumed that the information propagated from A to B has a high probability of being propagated to C. However, this is obviously not necessarily the case, as illustrated in the following scenarios: (1) All the interactions between A and B happened years ago and they have not interacted since then, while B and C only started communicating lately; and (2) the interactions between A, B, and C happened in the same year. Most of the time after A and B interact, B interacts with D and E rather than with C. However, B and C still have many interactions but not after the interactions between A and B. The two cases presented above are not handled in an effective manner or are ignored by most recent information flow approaches.

Note also that the individual communication graph is a simplification of reality. In real data, it is common to observe that a person is involved in multiple communication chains, even during a short time period, since (s)he may receive or initiate multiple calls from or to more than one persons within the predefined time window W. For example, let's consider the CDR in Table 2 below, which includes six records:

TABLE 2

CDR (Call Detail Record)

| caller | callee | timestamp | duration |
|---|---|---|---|
| 1 | 2 | 10:09 am, 11-Jun | 20 seconds |
| 6 | 2 | 10:12 am, 11-Jun | 30 seconds |
| 7 | 2 | 10:15 am, 11-Jun | 50 seconds |
| 2 | 3 | 10:20 am, 11-Jun | 60 seconds |
| 3 | 4 | 10:40 am, 11-Jun | 120 seconds |
| 3 | 5 | 10:46 am, 11-Jun | 20 seconds |

Figure 3:
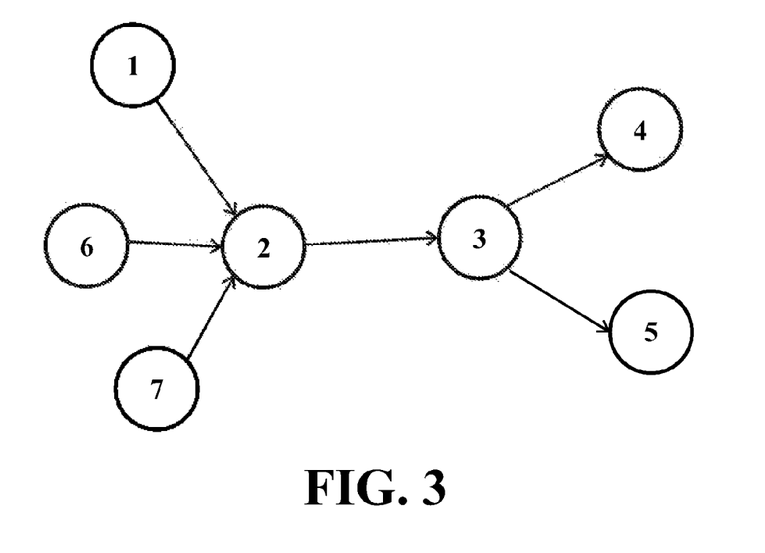
FIG. 3 shows a graph representation of a group of interactions from another CDR.

FIG. 3 shows the corresponding communication graph for W=30 minutes. It is not clear from the graph which piece of information is propagated from 2 to 3, given that 2 has received information from 1, 6, and 7. As a result, some of the individual communication graphs may be misleading and not semantically meaningful. To deal with this difficulty, we propose to filter out the communication graphs with a frequency constraint: in order to be considered, the same type of communication graph must appear more than a certain number of times in the social interaction network. The underlying idea of using frequency is based on the fact that true communication patterns will remain in spite of noise.

Accordingly, we introduce the concepts of graph equivalence and communication motifs.

Definition of Graph-Equivalence: For any two communication graphs, $C_1 = <e_1, e_2, \ldots e_k>$ and $C_2 = <e_1', e_2', \ldots, e_k'>$, let $S_1$ and $S_2$ be the set of distinct users from graphs $C_1$ and $C_2$, respectively. If there is a one-to-one function $f$ between the users in $S_1$ and $S_2$, such that $\forall e_i \in C_1, \exists (f(U_i^o) \to f(U_i^d) \in C_2)$, and vice versa, then these communication graphs are referred to as being equivalent.

Basically, two graphs are equivalent if they share the same topology structure. Based on the graph-equivalence definition above, we define the communication motif.

Definition of Communication Motif: Given a support threshold $\Theta$, then any equivalence class of the communication graphs $S = \{C_i^j(1), C_i^j(2), C_i^j(3), \ldots C_i^j(n)\}$ based on the graph-equivalence with no less than $\Theta$ communication graphs is referred to as a communication motif. In addition, the cardinality of the equivalence class S is referred to as the support of the communication motif.

Figure 4:
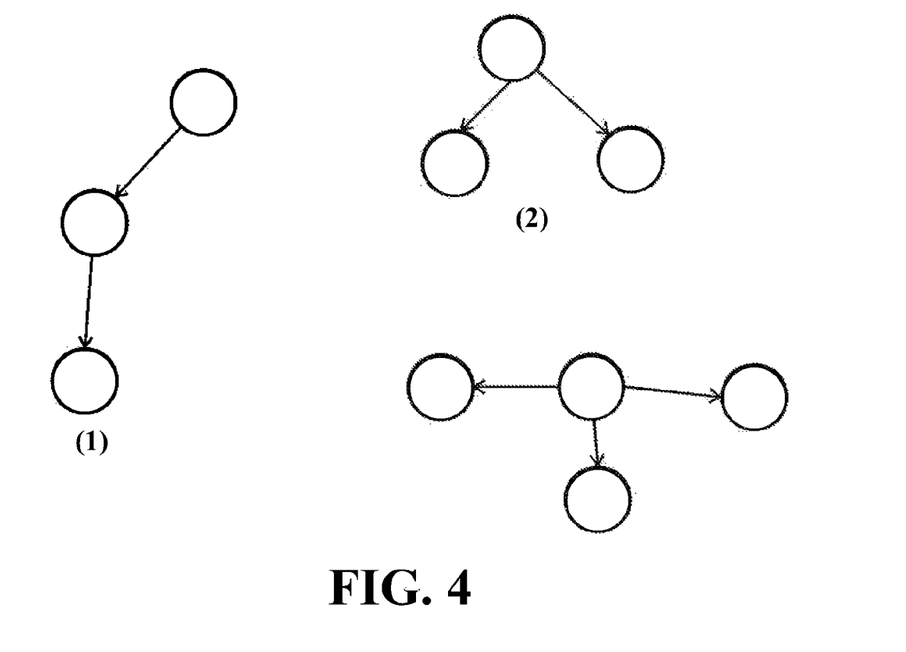
FIG. 4 shows the support for three communication motifs found in the graphs shown in FIG. 2.

Example: Taking the sample CDR database in Table 1 and the four communication graphs g1-g4 shown in FIG. 2, FIG. 4 illustrates the support for three communication motifs that are found in the graphs. The first communication motif has a support of 5 (3 times in the first graph and 2 times in the second graph), the second has a support of 3, while the last one has a support of 2.

Finally, note that in order to deal with potential biases and local noise, we would like the communication graphs of the motifs to be evenly distributed in the social network, particularly given that the motifs are supposed to capture intrinsic properties of the network. Hence, we would like to avoid a situation where the majority of communication graphs in a motif start from the same node (e.g., phone number). Thus, we introduce the concept of L-support to set an upper bound on the number of communication graphs per origin that are taken into account in the overall support of the communication motifs.

In sum, the method proposes to characterize the functional communication patterns of social interaction networks that not only occur frequently but also are indicative of the process of information propagation in the network.

Motifs have been defined to be a representation of the functionalities embedded within the social network. They are meant to capture patterns on the collective behavior of users in the network. However, if we want to apply the motifs to real-world scenarios such as viral marketing, we need to define a measure to quantify the probability of information propagation within each motif.

We extend next the definition of motif by adding quantitative measures based on the temporal properties of each interaction within the motif. We define the maximum-flow motif as a structure (motif) where information is likely to propagate with the least possible amount of information loss. Maximum-flow motifs are standard motifs with the added constraint of maximizing the flow of information. That is, each node (phone call) within the maximum-flow motif is expected to maximize the flow of information.

Definition of Maximizing the flow of information: Given two connected calls $e_i = <u_i^o, u_i^d, t_i, \delta_i>$ and $e_j = <u_j^o, u_j^d, t_j, \delta_j>$, $e_i$ and $e_j$ maximize the flow of information if for all connected calls G', where $e_j \in G'$, there is no other $e_{j'}$ such that $\delta_j/(\delta_i \times (t_j - t_i)) \leq \delta_{j'}/(\delta_i \times (t_{j'} - t_i))$.

For example, in the network in FIG. 3, given a call 7→2, the maximum information flow motif originated at this interaction would be 7→2, 2→3 and 3→4, but 3→5 will not be included in the maximum flow motif, because its information flow (duration of the call) is smaller than the call 3→4.

Figure 5:
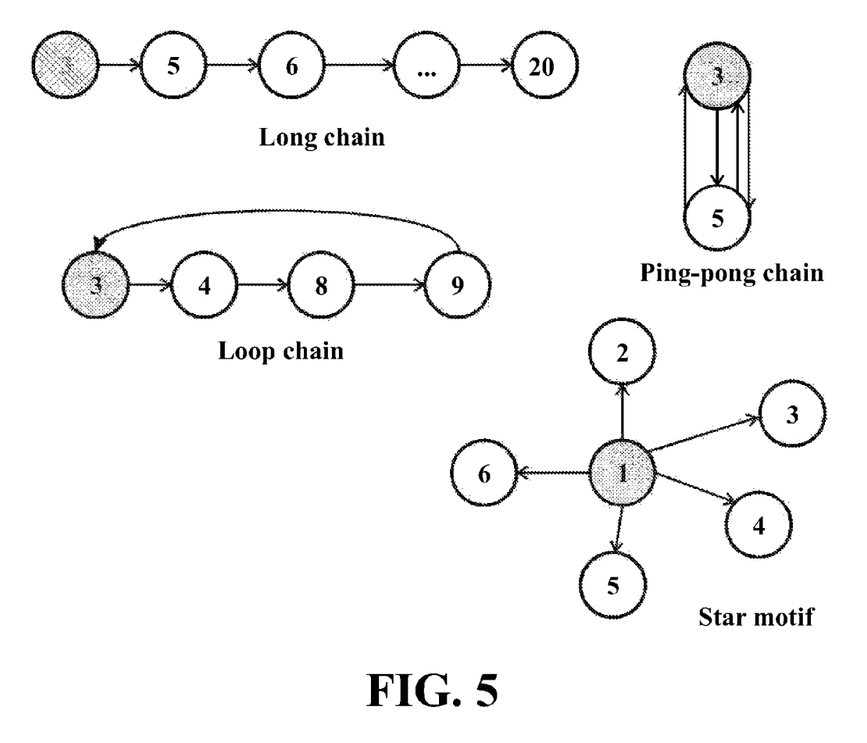
FIG. 5 illustrates different types of communication motifs.

Based on the previous definitions, the communication motifs may reveal aspects of the principles and dynamics in the communications that take place within the network. FIG. 5 illustrates four basic types of communication motifs with different information flow patterns: (a) Long chain: which is a communication graph with an extreme long list of unique participants, such as 3; 5; 6; . . . , 20 in the Figure; (b) Ping-pong: which represents a pattern with very few participants that repeatedly communicate back-and-forth with each other, such as 3; 5 in the Figure; (c) Loop: where there is a loop in the communication between some of the participants—but not a ping-pong loop—, such as from 3 to 4, 8, 9, and back to 3 in the Figure; and (d) Star: where all the interactions start/end on a limited number of members of the graph.

In general, a communication motif involves a number of distinct participants and a combination of the basic motifs defined above. The distribution of the basic motifs within the larger motif is an indication of how information flows within the motif, how fast it may spread and of the topology of the social network.

One important goal of studying motifs is to better understand the information propagation patterns in social networks. Therefore, the main interest is in motifs that involve more than two users since a single interaction between only two users and/or the 2-people ping-pong structures are not functionally suitable for propagating information.

The communication motifs and maximum-flow motifs are extracted from the data according to motif generation processes, which are explained in detail below. In the case of communication motifs, because the entries in the dataset are stored in temporal order, an earliest first search (EFS) strategy is used to extract the motifs. Conversely, a maximum-flow first search (MFS) strategy is used for maximum-flow motif discovery since dataset entries that propagate large volumes of information are desired.

Algorithm 1 above outlines an earliest first search (EFS)-based motif extraction process. Given a user in a social network and a communication initiated by this user, the EFS algorithm traverses the adjacent edges following this initial communication (entry in the dataset) in non-descending order of the time stamps of the edges. Whenever an edge is found to be within the given time window W, it is added to the subgraph. Then, the algorithm continues to visit more edges that are connected to the subgraph until no new edges that satisfy the time window constraint can be found. The found subgraph is added to the candidate repository, which is later filtered by the support threshold $\Theta$.

Algorithm 1: Communication motif extraction

Input: Communication graph G, time window W, threshold $\Theta$
Output: A list of communication motifs M with their corresponding support -continued Algorithm 1: Communication motif extraction

```
Generate a set of seed entries S in G;
M ← ∅;
foreach entry e ∈ S do
    C ← ∅; /* C is the subgraph to be extracted */
    P ← {e}; /* P stores the entries pending to be processed */
    while P is not empty do
        $e_i$ ← the entry with the smallest time stamp in P;
        C ← C ∪ {$e_i$};
        foreach $e_j$ adjacent to $e_i$ do
            if 0 < $t_j - t_i - δ_i$ ≤ W then P ← P ∪ {$e_j$}
    Anonymize the user IDs in C;
    M ← M ∪ {C};
    Increase the support of C in M by 1;
foreach C ∈ M do
    If C.support < θ then remove C from M;
return M
```

The maximum information flow motifs are identified with the maximum-flow first search algorithm listed in Algorithm 2. Starting from a given entry in the dataset, the algorithm iteratively visits the adjacent edge that carries the maximum volume of information, and adds it to the local motif subgraph. Thus, the algorithm traverses the network following the path that propagates the largest volume of information.

Algorithm 2: Max information flow motif extraction

```
Input: Communication graph G, time window W, threshold θ
Output: A list of maximum information flow motifs $M_i$
Generate a set of seed entries S in G;
M ← ∅;
foreach entry e ∈ S do
    C ← ∅; /* C is the subgraph to be extracted */
    P ← {g}; /* P stores the entries pending to be processed */
    while P is not empty do
        $e_i$ ← the entry with the smallest time stamp in P;
        C ← C ∪ {$e_j$};
        $e_j$ ← the adjacent entry of $e_i$ within W that maximizes $δ_j/(δ_i(t_j - t_i))$;
            P < P ∪ {$e_j$}; /* $e_j$ might be ∅ */
    Anonymize the user IDs in C;
    $M_1$ ← $M_1$ ∪ {C};
    Increase the support of C in $M_1$ by 1;
foreach C ∈ $M_1$ do
    If C.support < 0 then remove C from $M_1$;
return $M_1$
```

These new concepts of communication motifs and maximum-flow motifs have been introduced to model how information is propagated in social networks. The proposed motif concepts are an extension of the network motif in biological networks, which refers to patterns that recur within a network much more often than at random.

The information propagation behavior in these social networks has been characterized using these motifs as a measurement, and has lead to the following findings:

The functional behavioral patterns of information propagation within a communication network are stable over time.

The patterns of information propagation in synchronous and asynchronous social networks are different and sensitive to the cost of communication.

The amount of information being propagated and its speed are correlated and depend on user profiles.

Temporal information is used to filter out some of the noise that is present in current social network analysis approaches, particularly when the content of communication is private or missing. The proposed motif discovery algorithm does not use any content information, but temporal information is not the only constraint: there are also topological and frequency constraints to ensure that the discovered motifs are statistically significant when compared to sub-graphs in an equivalent random network.

The proposed method for characterizing social networks may be used for a number of important business applications, including but not limited to:

a. Viral Marketing and Interaction Recommendation:

The temporal stability of the motifs suggests that they can be a general and useful characterization of the network and useful for viral marketing. One could apply incentive strategies or recommendations for mobile service providers or social network sites to increase the level of user interactions based on the discovered motifs. For example, mobile service providers typically have a family or group plan for a group of users. The motif frequency, coverage and average size could be used to optimize the plan strategies. Mobile operators could design an optimized family or group plan with a specific number of users and a certain duration of free talk time by measuring the size of the motifs that have a minimum percentage of user coverage and a minimum duration of the communications within the motifs.

Online social network sites are starting to recommend communications within the network—such as recently introduced by Facebook—which will in turn increase the levels of activity in the network. The motif extraction process would allow selecting the recommended interactions in such a way to optimize coverage. Moreover, the influence of individual users can be quantified by studying the properties of the motifs they are involved in, which may be critically important in order to improve viral marketing strategies from a different perspective than existing approaches.

b. Automatic Identification of Communication Roles:

Motif features such as the types of motifs a user is involved with, the position (or role) of the user in the motif, the user's ratio in in-degree and out-degree, the cardinality of the motif, and the frequency and distribution of the motif, can all be used to infer relations between user pairs. For example, a user A that is at the center of a star-shaped motif plays a different role in the relationship than a user B who is in the tail of a long chain-shaped motif. Even within the same type of motif, users with different in-degrees and/or out-degrees, involved in earlier or later interactions within the motif, play different roles in the communication. By exploring the properties of individual users in the context of communication motifs, the accuracy of role and relation identification in communication and social networks could be substantially improved.

c. Optimization of Communication Costs:

The correlation between communication costs and the motifs that are found in a communication network can be used to understand the role that costs play in determining the patterns of communication between the members of the network. As the cost of communication increases, users tend to only communicate with a reduced number of their contacts, hence creating different motifs (with smaller diameter and out-degree) than when the cost of communication is low. Given these correlations between cost and motifs, network providers may make efficient predictions of the success of their viral marketing strategies and hence maximize the spread of information with resource constraints. Moreover, based on the cost of communication and its patterns, we can further model the incentives and associated strategies to either increase or decrease the activity and coverage within the network. Thanks to the automatic discovery and characterization of motifs, network providers can either maximize revenue or influence with limited budget. For example, a mobile service provider may adjust the pricing given the target of maximizing the level of activity and hence the revenue, while an advertiser may maximize its influence in the network given a certain budget by selecting the customers that are part of maximum information flow motifs.

Experiments

A comprehensive analysis of two real social network communication datasets has been conducted in order to study the characteristics of the motifs within these social networks.

The two real social network communication datasets used in the experiments are:

1) A Call Detail Record (CDR) dataset that has been collected from a large western city for a duration of three months and for a specific mobile service provider. It contains 17,800,000 entries (phone calls) among 245,600 unique users.

2) The wall-post history of Facebook, collected for the New Orleans Facebook network for a duration of over two years with 800,000 interactions among 65,000 unique users.

The communication motifs are extracted from both CDR and Facebook, and the maximum information flow motifs from CDR using the duration of each call.

TABLE 3

Overall distribution of motifs (W = 4 hours)

| Dataset | CDR | Facebook | Random |
|---|---|---|---|
| Isolated entries | 74.3% | 69.7% | 99.99% |
| 2-people Ping-pong | 11.4% | 14.5% | 0.01% |
| Communication motifs | 14.3% | 15.8% | 0 |

Table 3 presents the overall distribution of three types of basic communication building blocks in three networks (CDR, Facebook and random): isolated entries (i.e. entries that have no other related entries within the given time window); 2-people ping-pong motifs (repeated entries that only involve 2 people) and other communication motifs. The random network is a synthetic communication network that: (1) has exactly the same topology as the CDR dataset (i.e., the number of calls between any two users is identical), but where (2) the timestamps for all calls that are made within the given time period are randomized. The motif extraction algorithms were also run on this synthetic dataset. In all datasets, we can see that the majority of entries are isolated. However, while the 2-people ping-pong motifs and communication motifs both comprise about 15% of the total entries in the CDR and Facebook datasets, such motifs can hardly be found in random networks. This result strongly suggests that the time-constrained motifs in social communication networks are driven by the special characteristics of human activities (such as the propagation of information).

As mentioned before, the analysis of the data is only based on the motifs that involve three or more users (they represent about 15% of the interactions in the datasets).

Motif Frequency Distribution.

Figure 6:
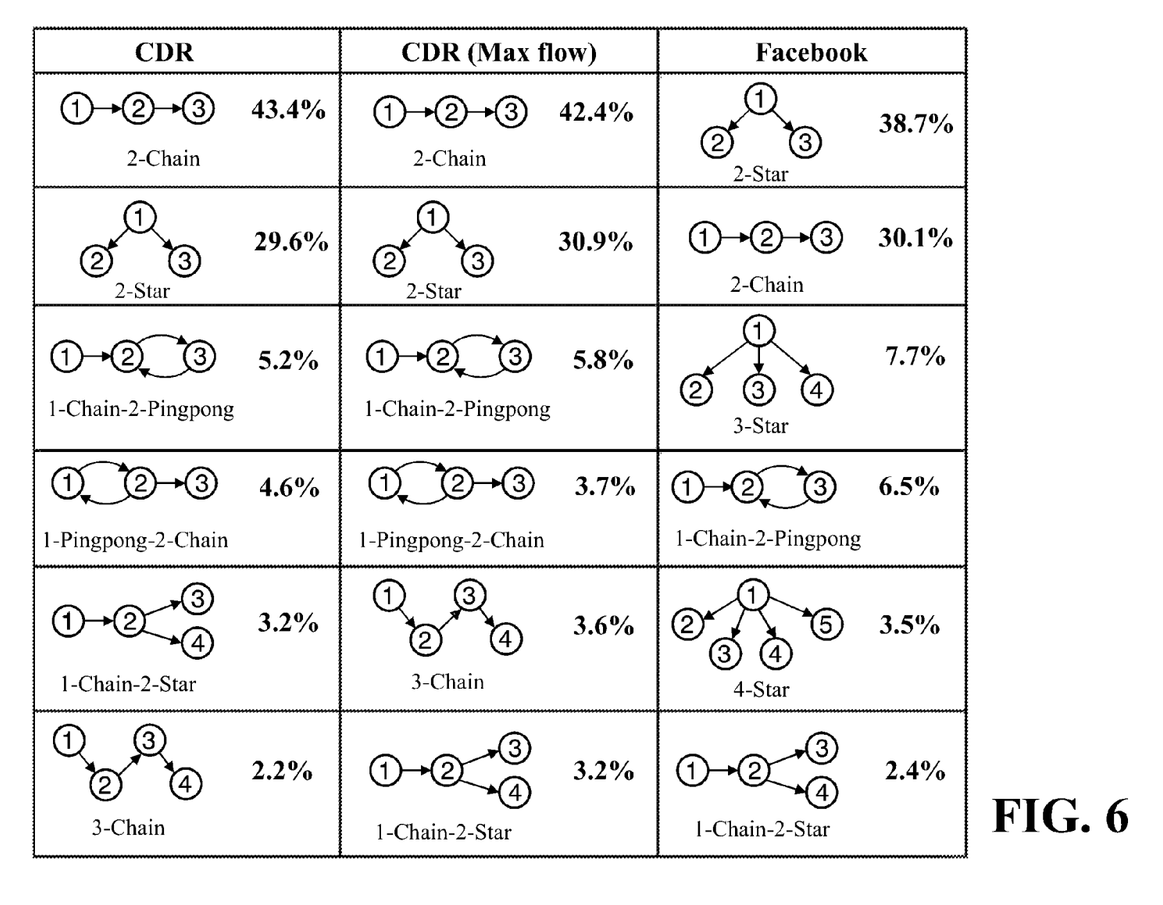
FIG. 6 shows the most frequent motifs extracted from the datasets used in the experiment (obtained with a time window W=4 hours).

First, the motifs from both social networks are extracted and it is computed how frequent they are within each network. FIG. 6 shows the six most frequent motifs from the datasets (obtained with a time window W=4 hours). Note that hereafter the support is converted into a percentage, based on the ratio of frequency to the total number of entries in the dataset so that the results across datasets are comparable. Clearly, there are frequent motifs that are shared by both datasets, such as the 2-chain and 2-star topologies. This indicates that the communication behaviors of people are similar even in different environments. On the other hand, we can also observe some differences in the frequent motif lists: the Facebook dataset contains considerably more star structures than the CDR dataset while the CDR dataset has more chains.

Figure 7:
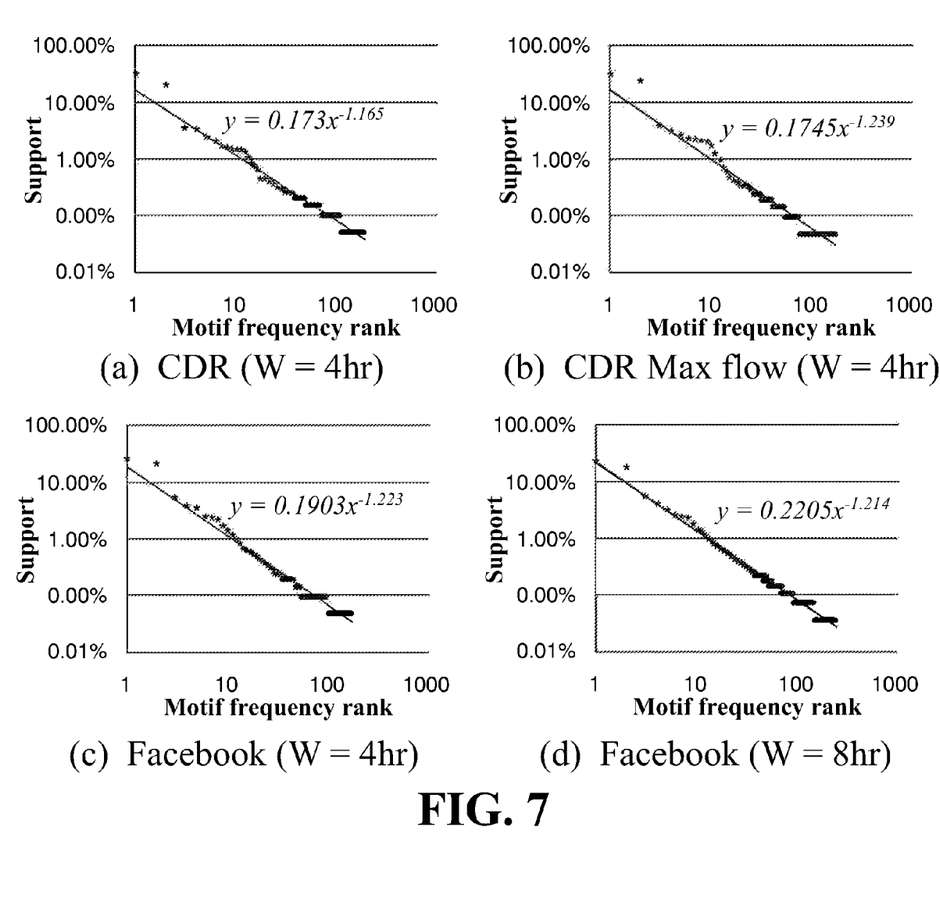
FIG. 7 shows the correlation between the support and the ranking of the motifs.

FIG. 7 shows the correlation between the support and the ranking of the motifs. Here, note that the smaller the value on the X-axis, the more frequent the motif is. In both datasets and under different time window sizes (W=4 hours in the CDR and W=8 hours in the Facebook datasets), the support and ranking of the motifs follow a power law distribution. Therefore, as the rank increases, we can expect the support of the motifs to drop sharply.

Impact of the Time Window.

Figure 8:
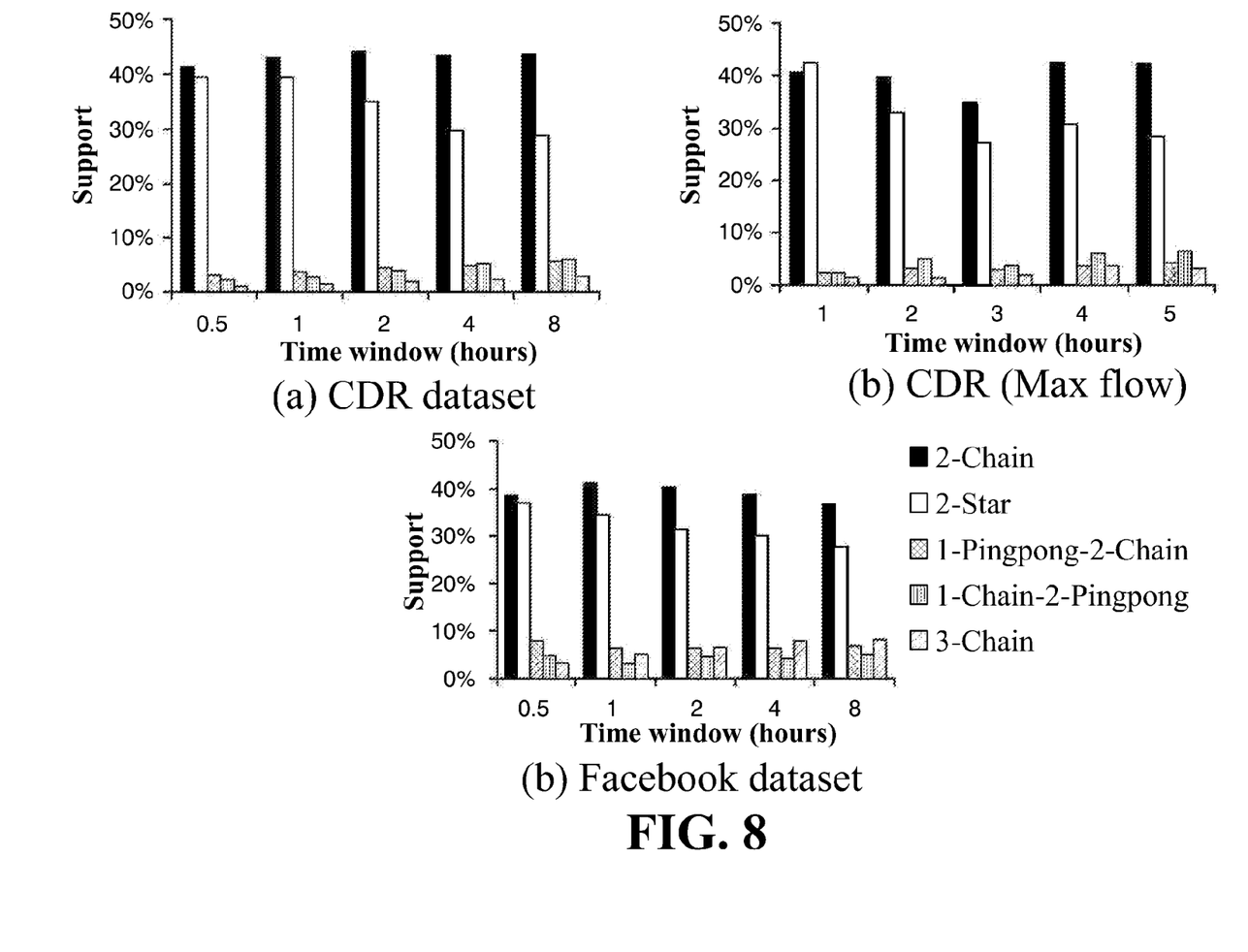
FIG. 8 graphically shows the impact of the length of the time window W.

Next, the impact of the time window W on the support of motifs is examined by varying its value from 30 minutes to 8 hours. Note that W imposes a constraint on the temporal proximity with which the interactions take place. As can be seen in FIG. 8, while the absolute number of supports grows as the time window increases, the relative support distribution of motifs is not very sensitive to the time window size. However, there are two interesting exceptions: the 2-Star motif in the CDR dataset and the 2-Chain motif in the Facebook dataset have decreasing ratios in the support distribution as the time window size grows. This result, particularly when combined with the comparison of motifs with the random network in Table 2, suggest that the time-constrained motifs in social communication networks, though generally not sensitive to the time window, are driven by the special characteristics of human activities (such as the propagation of information).

User Coverage.

Figure 9:
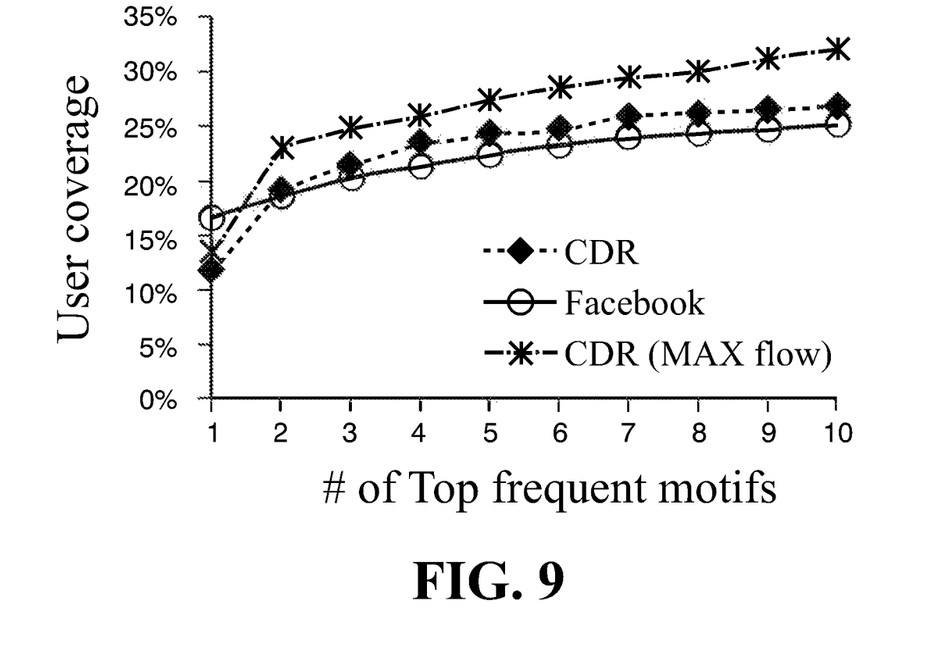
FIG. 9 shows the users coverage for the most frequent communication motifs in the experiment.

A user coverage analysis was also carried out in order to measure the portion of users involved in some motifs. If many users are covered, that means the motifs are commonly seen/evenly distributed in everybody's activities. FIG. 9 shows that while the top 10 motifs only represent about 8% of the total dataset, together they cover more than 30% of users in the network. Therefore, we believe that the motifs are meaningful substructures to represent social networks. The user coverage of motifs in the Facebook network is slightly larger than that in the CDR network, which may indicate that more users tend to adopt the motifs when they need to disseminate information instead of just casual communication.

As indicated before, the present invention relates to a method for characterizing social network communications. It is to be understood that the above disclosure is an exemplification of the principles of the invention and does not limit the invention to the described embodiments.

The invention claimed is:

1. A method for characterizing a network communication, for each communication interaction between two users, $u_i^o$, $u_i^d$, of said network, the method comprising:

obtaining a temporal annotation $t_i$ of each communication interaction, and a duration $\delta_i$ of each communication interaction, characterizing, using a computer system, said network communication, thereby creating a communication graph C;

wherein a first communication interaction and a second communication interaction within the network are considered for characterization of such network and form part of a communication graph C if:

a) said first and second communication interactions have at least one user in common; and, b) the time lapsed between the end of the first communication interaction and the beginning of the second communication interaction is within a pre-established time window W;

wherein each communication graph $C_i^j$ is formed by i unique users and j communication interactions that fulfil the conditions a) and b) set before, and wherein for a given a support threshold $\Theta$, any equivalence class of the communication graphs $S=\{C_i^j(1), C_i^j(2), C_i^j(3), \ldots C_i^j(n)\}$ based on graph equivalence with no less than $\Theta$ communication graphs is referred to as a communication motif.

2. Method according to claim 1, which further comprises the step of filtering out each communication graph with a frequency constraint.

3. Method according to claim 2, in which a communication graph is considered for characterization if the same type of communication graph appears more than a certain number of times in the interaction network.

4. Method according to claim 3, wherein two communication graphs are considered of the same type or equivalent when they share the same topology structure.

5. Method according to claim 1, wherein each communication motif is extracted using a process based on an earliest first search EFS.

6. Method according to claim 1, wherein a communication motif is a maximum-flow motif when it maximizes the flow of information within the network.

7. Method according to claim 1, wherein the size of the time window depends on the type of network.

8. Method according to claim 1, wherein a communication graph has to appear more than a certain number of times in the network in order to be considered.

9. Method according to claims 1, wherein said temporal annotation $t_i$ is a timestamp of the beginning of the communication interaction.

10. Method according to claim 1, wherein said temporal annotation $t_i$ is a timestamp of the end of the communication interaction.

* * * * *